United States Patent [19]

Melchior

[11] Patent Number: 4,530,806

[45] Date of Patent: Jul. 23, 1985

[54] PROCESS OF MAKING ARTICLES OF FOAMED POLYMETHYL METHACRYLATE

[75] Inventor: Bernd Melchior, Burger Strasse 255, D 5630 Remscheid, Fed. Rep. of Germany

[73] Assignees: August Hohnholz KG, Hamburg; Imchemie Kunststoff GmbH, Wermelskirchen; Bernd Melchior, Remscheid, all of Fed. Rep. of Germany

[21] Appl. No.: 386,337

[22] Filed: Jun. 8, 1982

[30] Foreign Application Priority Data

Jun. 25, 1981 [DE] Fed. Rep. of Germany ....... 3124980

[51] Int. Cl.$^3$ ............................................. B29D 27/04
[52] U.S. Cl. ...................................... 264/22; 264/53; 264/331.18; 264/DIG. 5; 264/DIG. 13; 425/817 R
[58] Field of Search ............... 264/53, 22, DIG. 5, 264/DIG. 13, 331.18; 425/817 R

[56] References Cited

U.S. PATENT DOCUMENTS

| | | | |
|---|---|---|---|
| 3,458,248 | 7/1969 | Eversole | 264/53 X |
| 3,661,807 | 5/1972 | Seiner | 264/53 X |
| 3,663,670 | 5/1972 | Swayne et al. | 264/53 |
| 3,673,126 | 6/1972 | Carmody et al. | 264/53 X |
| 3,813,462 | 5/1974 | Roberts | 264/53 X |
| 3,823,027 | 7/1974 | Wismer et al. | 264/53 X |

FOREIGN PATENT DOCUMENTS 1423844 11/1965 France .
1448621 9/1976 United Kingdom .

*Primary Examiner*—Philip E. Anderson
*Attorney, Agent, or Firm*—Frishauf, Holtz, Goodman & Woodward

[57] ABSTRACT

The invention relates to a process of making articles of foamed polymethyl methacrylate (PMMA). In a first process stage a mixture comprising monomeric methyl methacrylate, plasticizer, preferably liquid foaming agent and catalyst is polymerized by heating and/or irradiation to form a foaming agent-containing solid body. In the second process stage this body is foamed by heating to the softening temperature of the plastic material. Either of these stages may also be performed continuously. The final product is clear-transparent and has large closed cells, a smooth surface, is light- and weather-resistant, readily workable, has good thermal insulation properties also in combination with plastics or glass coatings and may be used in a variety of applications, especially as a transparent insulating slab or plate.

16 Claims, 2 Drawing Figures

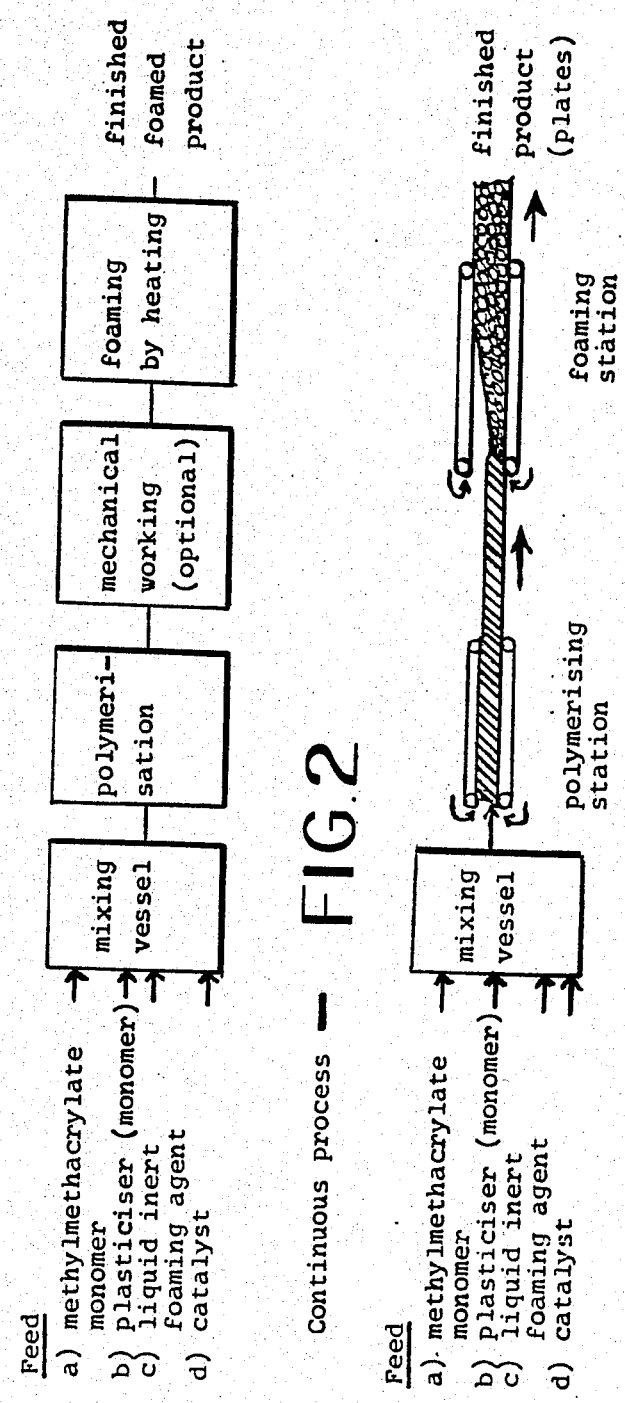

PROCESS OF MAKING ARTICLES OF FOAMED POLYMETHYL METHACRYLATE

TECHNICAL FIELD

The present invention relates to a process of making articles of foamed polymethyl methacrylate, which are in particular transparent and may take the form of sheets, boards, shaped articles and laminated articles having a foamed core.

BACKGROUND OF THE INVENTION

It is known to make foamed materials from synthetic plastics such as polyurethane. Basically, there are two processes available. In the first process, the starting composition comprising monomers and foaming agent is polymerized and simultaneously foamed in a single-stage process. According to this process useful products can be obtained only if the monomers polymerize rapidly and thus form a mechanically stable product which may be foamed by the gases or vapours of the foaming agent, whereby stable cells are formed.

In the second known process the monomeric starting material is initially polymerized with the admixed foaming agent without being foamed, whereupon in a second stage the polymer is brought into a plastic or fluid condition by heating while simultaneously the foaming agent is either evaporated or decomposed, so that gas bubbles or cells are formed in the synthetic material and a foamed plastic is obtained.

In the case of polymethacrylates none of these known processes leads to the desired success. In the first-mentioned process, it is impossible to keep the bubbles (cells) in a stable state during the polymerization of the acrylic foam. Due to the polymerization the surface tension of the bubbles increases so that they burst and combine with each other, thus causing the foam to collapse before it is cured.

The known two-stage process also does not lead to the desired success in the case of polymethacrylates. According to the British Patent Specification No. 1,448,621 and the French Patent Specification No. 1,423,844 a polymethacrylate is to be foamed by initially polymerizing a methacrylate with a foaming agent admixed thereto under conditions which inhibit the activation of the foaming agent. In a second stage the cured polymethacrylate is heated to the softening temperature at which the foaming agent will be activated. But because of the high internal pressure the foamed plastic substantially comprises only small bubbles or cells. Experiments have shown that during foaming the polymethacrylate composition is blown to all sides to result in a foam with a wavy and warped surface. The products obtained therefrom furthermore have little transparency and permit the light to pass therethrough only diffusely because it is reflected by the numerous small bubbles or cells.

There is a demand for a clear, transparent foamed plastic on a polymethyl methacrylate basis, which has a high transparency and at the same time good mechanical stability and high thermal insulation property as well as a smooth surface structure and which may be obtained in the form of sheets, boards or slabs, shaped articles and laminated or multilayer articles having a foamed core. It is impossible with any of the known processes to make such a foamed plastic, which is also fundamentally different with respect to its structure from known transparent extruded laminated boards of synthetic materials, which comprise in their interior either webs or closely adjoining very small or capillary-type tubes.

DESCRIPTION OF THE INVENTION

It is the object of the present invention to provide a process for the manufacture of articles of foamed polymethyl methacrylate, which process results in an especially transparent foamed plastic having closed large planar cells of controlled size, shape and density, and having a smooth, non-porous surface, which furthermore permits the manufacture of shaped articles and multilayer or laminated articles.

The above-specified object is solved by the process according to the invention, in which (1) a composition containing:
   (a) monomeric methyl methacrylate and possibly monomeric acrylate;
   (b) a plasticizer;
   (c) a foaming agent which neither evaporates nor decomposes at the polymerization temperature;
   (d) at least one polymerization catalyst; is prepared at a temperature below the evaporation or decomposition temperature of the foaming agent and subsequently is polymerized at a pressure in excess of the evaporation pressure of the foaming agent at the polymerization temperature, possibly in a mould, to form a—particularly board- or slab-shaped—body, and (2) the thus prepared foaming agent-containing solid body—possibly after mechanical treatment thereof—is foamed on a non-adherent substrate by heating to a temperature in excess of the evaporation or decomposition temperature of the foaming agent and in excess of the softening temperature of the polymer.

BRIEF DESCRIPTION OF THE DRAWINGS

FIG. 1 is a flow sheet for the discontinuous process; and

FIG. 2 is the flow sheet for the continuous process.

Preferred quantities for the starting mixture are as follows:

(a) 100 parts by weight of methylmethacrylate and possibly acrylate monomer
(b) 5 to 40 parts by weight of plasticizer
(c) 10 to 100 parts by weight of foaming agent
(d) polymerization catalyst in usual quantity.

What is of especial importance to the process of the present invention is the use of the plasticizer (b), which is preferably a monomeric alkyl methacrylate with the alkyl group including at least 3 C-atoms, preferably an n-butyl methacrylate monomer or an ethylhexylmethacrylate monomer, wherein this plasticizer is used in a quantity of preferably 5 to 25 parts by weight, and most preferably 10 to 15 parts by weight per 100 parts by weight of the methyl methacrylate monomer (a). By means of the quantity and type of the added plasticizer it is possible to control the softening properties of the foaming agent-containing solid body of polymethyl methacrylate obtained on polymerization and thus to control the foaming temperature as well as the size and number of cells and the mechanical properties of the obtained article of foamed polymethyl methacrylate, particularly the strength and elasticity thereof.

The foaming agent used is preferably a conventional liquid inert foaming agent having a boiling point below 100° C., particularly a saturated hydrocarbon or fluorocarbon, preferably butane, pentane, hexane or, respectively, trichlorofluoromethane or trichlorotrifluoroethane, because the boiling points of such foaming agents are above ambient temperature so that blending of the starting mixture may simply be performed in an agitated vessel at atmospheric pressure. The use of a solid foaming agent which supplies expansion gases upon decomposition thereof is less suitable, because such foaming agents do not result in clear, transparent foamed plastics and since they particularly permit the formation of only small cells which cause the foamed plastic to appear opaque. Moreover, solid foaming agents normally have a decomposition temperature in excess of 100° C. and therefore require higher foaming temperatures.

It is within the scope of the process according to the present invention to perform the polymerization in any manner known per se for methyl methacrylate with the respective catalysts.

As the polymerization catalyst (d) there may especially be used a conventional peroxide catalyst which becomes active on being heated. If it is required for the polymerization to effect heating at a temperature in excess of the evaporation temperature of the foaming agent, the polymerization will naturally be effected under pressure in order to prevent premature liberation of the foaming agent. Although the use of solid foaming agents together with such a peroxide polymerization catalyst is possible, it is not preferred.

According to a particularly advantageous embodiment of the process of the present invention a photo-initiator is used as the polymerization catalyst, which permits polymerization of the composition at low temperature, especially approximately at room temperature, by means of exposure to a radiation matched to the photo-initiator, e.g. ultraviolet light of 350 nm in the case of a photo-initiator known for acrylate monomers. In this embodiment of the polymerization it is possible especially to control the polymerization reaction by energization and de-energization of the sources of radiation in such a way that the temperature in the polymerizing composition does not exceed a predetermined value during the exothermic polymerization reaction, said predetermined value being just below the evaporation temperature of the liquid foaming agent. Control may be effected in a simple way by using a thermocouple. Of course, in case of photo-polymerization the foaming agent-containing composition to be polymerized should be accessible to the radiation, i.e, it should either present a free surface or should be irradiated while disposed on a radiation-transmissive surface on one or preferably either side thereof while sandwiched between two such surfaces. As radiation-transmissive substrate or cover, preferably glass plates or sheets, are employed between which a space accommodating the liquid blend is defined by means of a sealing strip. Photopolymerization may be effected with layer thicknesses of from approx. 1 to more than 50 mm; preferably the layer thickness is within the range of from 1 to 10 mm, resulting after foaming in articles having a layer thickness of from 4 to 50 mm.

When performing polymerization in the specified manner with liquid foaming agents, which may also take place in a mould, an intermediate product in the form of a glass-clear transparent strong solid body of foaming agent-containing polymethyl methacrylate is obtained, the density of which depends on the type and quantity of the foaming agent used. Trichlorofluoromethane, for instance, results in a polymer having a typical density of 1.45 g/cm$^3$. Just like conventional polymethyl methacrylate, this intermediate product may be mechanically treated, in particular it may be cut and sawn. It leads itself conveniently to transportation and storage if it is not immediately delivered to the second process stage, in which it is foamed by heating to a temperature in excess of the evaporation or decomposition temperature of the foaming agent and in excess of the softening temperature of the polymer.

In this second process stage the foaming agent-containing solid body is retained on a non-adherent substrate so that its two-dimensional expansion both in longitudinal direction and widthwise thereof upon foaming is not impeded and the formation of large closed cells in the foamed material is permitted. A PTFE-coated glass or metal surface is especially suitable as such a non-adherent substrate.

If the expansion of the foamed object in upward direction is to be limited, a cover surface, which suitably also has an anti-adhesive coating thereon, is provided at an appropriate distance from the substrate, the distance between both surfaces appropriately being not substantially less than the height of the foaming agent-containing solid body when foamed unrestrictedly, so that the formation of large cells is not obstructed. When the foamed body contacts the cover surface the cells both at this surface and at the surface of the substrate will be flattened so that, if desired, a substantially planar surface of the finished article of foamed polymethyl methacrylate will be obtained.

It is particularly pointed out that both the polymerization of the composition in the first process stage and the foaming in the second process stage may be performed either separately or immediately succeeding one another continuously on a non-adherent conveyor belt or between two such smooth conveyor belts, which are moved in the same direction at an approximately constant spacing relative to each other and parallel to one another.

The discontinuous process illustrated in FIG. 1 is carried out as set forth in Example 1. The feed containing the components a, b, c and d are mixed in a mixing vessel and then the mixture is positioned between glass plates in the polymerization apparatus and polymerized. The glass plates are then separated and the polymerized slab removed and cut into plates of the desired shape in the mechanical working station. A cut polymerized plate is then placed between larger glass plates and foamed by heating in the foaming station to produce the finished foamed product.

In the continuous process illustrated in FIG. 2, the feed components a, b, c and d are mixed and positioned in the polymerizing station between two non-adherent smooth conveyor belts and polymerized in the polymerizing station between the two conveyor belts which are moved in the same direction at an approximately constant spacing relative to each other and parallel to each other into the foaming station wherein the polymerized continuous sheet is foamed and continuously passed out of the foaming station in the form of finished product.

Size and shape of the cells are influenced, on the one hand, by the kind of the starting composition, particularly the type and quantity of the ingredients a, b and c thereof, by the softening temperature of the polymer of the first stage and the expandibility thereof at the foaming temperature and, on the other hand, by the rate of heating in the second process stage during foaming as well as by the temperature used for foaming. Generally, when a liquid foaming agent having a boiling point of less than 100° C. is used, a foaming temperature of about 110° C., which may possibly also be higher such as about 160° C., and a foaming time of about 30 minutes will be sufficient.

The higher the temperature during foaming the more rapidly foaming will take place and the larger the cells or bubbles obtained will be. At a lower temperature the foaming will proceed more slowly, but large cells will also be obtained provided said lower temperature is maintained somewhat longer. Generally, the size of the cells will increase the longer a predetermined constant temperature is maintained. A particularly uniform foaming will be obtained when the temperature gradient in the composition is kept as small as possible, e.g. when the composition is heated by means of high frequency. For the rest, a thicker board or slab will have to be heated longer to obtain complete foaming thereof than a thinner board or slab of the same composition.

The density of the finished foamed article obtained after cooling may be set at 0.03 to 0.05 g/cm$^3$.

The articles obtained in accordance with the invention from foamed polymethyl methacrylate are characterized by relatively large closed cells having a diameter of about 5 mm and defined by thin walls so that the clear, transparent character of the polymethyl methacrylate is also distinctly retained in the foamed material and the latter exhibits very high transparency and appears clear, which is in contrast to the opaque appearance of foamed materials having small cell size and multiple reflection of light caused thereby. The mechanical and physical properties of the thus obtained foamed material of polymethyl methacrylate are excellent—in accordance with those of the basic material polymethyl methacrylate—for the most varied applications. The properties to be particularly stressed are its good strength and elasticity, good workability, rot-resistance, light- and weather-resistance and a substantially smooth surface on those sides where the foam contacted a non-adherent surface or substrate during formation thereof. Such articles are therefore especially suitable for constructional applications, as thermal and low-temperature insulating slabs and domelights, and also for ornamental purposes. Moreover, already during foaming of the foaming agent-containing solid body or after completion of such foaming operation the resulting finished foamed articles may be provided, coated or bonded with a backing of transparent sheets or boards made of plastic and glass, respectively, so that self-supporting laminated bodies having high transparency and high heat insulation property are obtained thereby, which may advantageously be used for a variety of constructional purposes, in particular for green houses.

If desired, colourants and/or filler materials or pigments may be admixed to the starting composition for preparing coloured, clearly transparent, opaque or non-transparent articles which exhibit the above specified advantageous properties.

EXAMPLE 1

600 g of monomeric methyl methacrylate (MMA), 72 g of n-butyl methacrylate monomer (BMA), 180 g of trichlorofluoromethane (b.p. 24° C.) as the foaming agent, 1.2 g of benzoyl peroxide as the heat polymerization catalyst, and 1.2 g of a conventional photo-initiator are blended in an agitated vessel at a temperature of less than 20° C.

The mixture is poured onto a planar glass plate provided with an anti-adhesive coating into the area defined thereon by a sealing tape having a height of 4 mm, so that the layer of the liquid mixture reaches the upper edge of the sealing tape. Then a second planar glass plate is placed thereon, which is also provided with an anti-adhesive coating on the side facing the composition.

Both glass plates with the mixture provided therebetween are held together by means of removable clamps, and the assembly is introduced into an exposure chamber where it is polymerized by means of ultraviolet fluorescent lamps having a spectrum which is optimum for the selected photo-initiator, e.g. fluorescent lamps Philips TW/05 which have a spectrum of substantially 350 nm, while the temperature of the composition is maintained just below the boiling temperature of the foaming agent, i.e., 24° C., by interrupting the exothermic polymerization reaction, when this desired temperature is reached, by turning off the fluorescent lamps for a predetermined period of time or until the temperature falls below 22° C. The polymerization carried out in this way is completed after about one hour. The glass plates are separated from each other, and a glass-clear, strong, solid slab of foaming agent-containing methyl methacrylate polymer having a density of 1.21 g/cm$^3$ is removed.

The obtained slab is foamed by heating either as produced or after cutting into plates of desired size. Such a glass-clear, solid, foaming agent-containing polymer plate of 117×117×4 mm is placed between two considerably larger glass plates which are coated on their facing sides with PTFE as an anti-adhesive agent and are maintained at a spacing of 18 mm. This assembly is completely foamed in a furnace at 110° C. for c. 30 minutes, wherein the polymer plate will expand two-dimensionally parallel to the glass plates and also with respect to height until the surface of the foamed plate abuts the upper glass plate. After completion of the foaming step the still warm plate of foamed polymethyl methacrylate removed from between the glass plate assembly is either permitted to cool on a planar surface, or it is removed from the glass plate assembly after cooling thereof as a whole. The thus obtained plate of foamed polymethyl methacrylate has a size of 330×330×18 mm and a density of 0.028 g/cm$^3$. It is rigid, slightly elastic and clear-transparent with closed pores having a diameter of about 5 mm. This plate is highly suitable as a good light-transmissive insulating material which may be placed between transparent plates made of glass or plastic and may possibly be bonded thereto so that self-supporting transparent insulating slabs, particularly for constructional purposes, domelights and the like are obtained.

EXAMPLE 2

In the starting mixture according to example 1 the photoinitiator was replaced by the same quantity of heat polymerization catalyst (benzoyl peroxide), and polymerization was performed within a pressure chamber while heating to 85° C. at a pressure in excess of the evaporation pressure of the foaming agent at this temperature. The polymerization was completed after about 60 minutes. After cooling a glass-clear strong solid plate of foaming agent-containing methyl methacrylate polymer was removed from the pressure chamber, which plate was foamed in the same way as described in Example 1 and resulted in a similar product.

EXAMPLE 3

In the mixture according to Example 1 the 72 g of n-butyl methacrylate were substituted by 72 g of n-butyl acrylate. The mixture was polymerized in the same manner as in Example 1, and the obtained solid, foaming agent-containing plate of methyl methacrylate polymer was foamed as in Example 1 and resulted in a foamed polymethyl methacrylate having the same properties as the product of Example 1.

EXAMPLE 4

In the mixture of Example 1 the 180 g of trichlorofluoromethane were substituted by 180 g of trichlorotrifluoroethylene (b.p. 45° C.). Polymerization was effected in the same way, but at a temperature between 40° and 42° C. within 40 minutes. The obtained glass-clear, solid, foaming agent-containing plate of methyl methacrylate polymer resulted upon foaming according to the procedure of Example 1 in a product similar to that of Example 1.

EXAMPLE 5

In the mixture of Example 1 the 180 g of trichlorofluoromethane were substituted by 180 g of n-pentane (b.p. 36° C.) as the foaming agent. The mixture was polymerized as in Example 1, and the obtained solid, foaming agent-containing plate of methyl methacrylate polymer was foamed as in Example 1 at 110° C. A hazy foamed polymethyl methacrylate having a density of about 0.032 g/cm³ was obtained.

EXAMPLE 6

0.6 g of trimethylolpropane trimethacrylate was added to the mixture of Example 1 as a cross-linking agent (0.1% based on monomeric methyl methacrylate). The mixture was polymerized in the same way as in Example 1, and the obtained solid, foaming agent-containing plate of methyl methacrylate polymer was foamed as in Example 1, but at a temperature of 100° C. While at this concentration of the cross-linking agent it is still possible to foam the solid, foaming agent-containing plate, one obtains a foamed product having small bubbles or cells and a density of about 0.035 g/cm³.

I claim:

1. A process of making articles of foamed polymethyl methacrylate comprising
(1) mixing
   (a) 100 parts by weight of monomeric methyl methacrylate;
   (b) 5 to 40 parts by weight of a plasticizer which is a monomeric alkyl methacrylate in which the alkyl group comprises at least 3 carbon atoms;
   (c) 10 to 100 parts by weight of a foaming agent that will neither evaporate nor decompose at the polymerization temperature and which is a liquid inert foaming agent boiling at a temperature of less than 100° C.; and
   (d) at least one polymerization catalyst;
at a temperature below the evaporation or decomposition temperature of the foaming agent to form a mixture and polymerizing said mixture at a pressure in excess of the evaporation pressure of the foaming agent at the polymerization temperature to form a solid body containing said foaming agent, and
(2) positioning said foaming agent-containing solid body on a non-adherent substrate and heating said solid body to a temperature in excess of the evaporation temperature of the foaming agent and in excess of the softening temperature of the polymer to foam said solid body and form a transparent foamed polymethyl methacrylate with closed cells having a diameter of about 5 mm. and a density of about 0.03 to 0.05 g/cm³.

2. The process of claim 1, wherein said monomeric alkyl methacrylate plasticizer is selected from the group consisting of butyl methacrylate, ethylhexylmethacrylate monomer and n-butyl acrylate and is in an amount of from 5 to 25 parts by weight of said mixture; and wherein said foaming agent is a fluorocarbon or hydrocarbon foaming agent.

3. The process of claim 2, wherein said foaming agent is selected from the group consisting of trichlorofluoromethane, trichlorofluoroethane, butane, pentane and hexane.

4. The process of claim 1, wherein said polymerization catalyst is a catalyst effecting polymerization of the mixture upon heating thereof, and said polymerization is carried out by heating said mixture and maintaining said mixture at a pressure in excess of the evaporation pressure of the foaming agent at the polymerization temperature.

5. The process of claim 4, wherein said polymerization catalyst is a peroxide catalyst.

6. The process of claim 1, wherein said polymerization catalyst is a photo-initiator causing photopolymerization of the mixture, and said polymerization is carried out by irradiating said mixture with radiation which causes polymerization and wherein the polymerization temperature is maintained below the evaporation temperature of the foaming agent at the pressure during polymerization.

7. The process of claim 6, wherein said radiation is ultraviolet light.

8. The process of claim 1, wherein said mixture is polymerized in a mould at a pressure in excess of the evaporation pressure of the foaming agent at the polymerization temperature to form said solid body.

9. The process of claim 1, wherein said foaming agent-containing solid body prepared in step (1) is subjected to mechanical working before being foamed on said non-adherent substrate by heating to a temperature in excess of the evaporation temperature of the foaming agent and in excess of the softening temperature of the polymer.

10. The process of claim 1, characterized in that said polymerization is conducted within a space which is defined by a sealing type between two smooth surfaces of two plates extending at equal spacing relative to one another, said sealing tape forming a closed curve and continuously contacting either of said plates along said curve, whereby a slab or plate shaped foaming agent-containing solid body is obtained.

11. The process of claim 10, wherein said two plates are glass plates.

12. The process of claim 1, wherein said polymerization of the mixture is conducted continuously within the laterally confined space between two smooth non-adherent surfaces of conveyor belts which extend parallel to and at approximately equal spacing from one another and move in the same direction.

13. The process of claim 1, wherein the foaming of the foaming agent-containing solid body obtained in the first process step is carried out by heating said solid body on a non-adherent substrate at atmospheric pressure, in the second process step.

14. The process of claim 1, wherein the foaming of the foaming agent-containing solid body is conducted within a mould comprising non-adherent mould walls, the spacing between said walls being slightly smaller than the maximum layer height of the article of foamed polymethyl methacrylate obtainable by unrestricted foaming.

15. The process of claim 12, wherein the foaming of the continuously obtained slab or plate-like foaming agent-containing solid body is performed continuously by heating said solid body on a non-adherent substrate to a temperature in excess of the evaporation temperature of the foaming agent and in excess of the softening temperature of the polymer.

16. The process of claim 1, wherein said 100 parts of the component (a) includes monomeric acrylate.

* * * * *